Feb. 13, 1968     R. J. BOUCHER     3,369,232
RADAR RANGE COMPUTER Filed Dec. 30, 1965     5 Sheets-Sheet 1

Fig. 1.

INVENTOR.
ROBERT J. BOUCHER,
BY
Robert Thompson
ATTORNEY.

INVENTOR.
ROBERT J. BOUCHER,
BY Robert Thompson
ATTORNEY.

FIG. 3.

Feb. 13, 1968  R. J. BOUCHER  3,369,232
RADAR RANGE COMPUTER

Filed Dec. 30, 1965  5 Sheets-Sheet 4

INVENTOR.
ROBERT J. BOUCHER,
BY Robert Thompson

ATTORNEY.

United States Patent Office 3,369,232
Patented Feb. 13, 1968

3,369,232
RADAR RANGE COMPUTER
Robert J. Boucher, Los Angeles, Calif., assignor to Hughes Aircraft Company, Culver City, Calif., a corporation of Delaware
Filed Dec. 30, 1965, Ser. No. 517,802
25 Claims. (Cl. 343—9)

ABSTRACT OF THE DISCLOSURE

In an FM three-phase Doppler radar wherein the frequency spacing between reflected energy components is proportional to target range, a range computer having a filter bank which is scanned to convert frequency information to time base information, a circulating storage means wherein each converted component of time base information is stored in a separate register as a digital bit and is read out by logic means to verify a target by the occurrence of three bits of information and to determine the target range by the spacing between the bits.

This invention relates generally to target range computing and relates more particularly to a computer which can be used with a Doppler radar to continually determine, during the search operation, the ranges of targets.

In the radar technology, it is conventional to use a single radar to search a volume of space containing a plurality of targets. If the particular radar used is a Doppler radar, it is also possible to discriminate between moving targets or stationary objects or clutter relative to the radar. These Doppler radars are usually capable of providing search information on target coordinates such as azimuth and/or elevation and range rate. Range information can also be accurately determined with a Doppler radar by providing FM ranging wherein the carrier signal is frequency modulated so that specific portions of the transmitted carrier signals can be identified by the particular frequency at any particular instant. The modulated frequency variations and the two-way time delay required for the propagated carrier to be transmitted to a target, reflected, and returned to the radar as an echo signal can then be utilized to determine the target range in accordance with the principles described hereinafter.

An object of this invention is to provide a simple and facile means for determining the range of a target from Doppler radar search information.

Another object is to provide an improved means for continually computing the ranges of a plurality of targets during the search operation of a Doppler radar.

Still another object is to provide a high-speed computer for determining the range of targets as FM ranging information becomes available from a radar.

Yet another object is to provide an improved Doppler radar range computer which is accurate, reliable and operates on a real time basis.

Another object is to provide a real time computer which confirms or verifies the occurrence of a target and determines the range rate and range of each such target during each search scan.

The above and other objectives of this invention can be achieved by a system including a Doppler radar coupled to a range computer which is, in turn, operable to process the radar echo signal into a signal proportional to range and display the information. The transmitted Doppler radar signals are frequency modulated into a three-phase signal which, when reflected from a target, becomes a Doppler-shifted and time-delayed echo signal which is received and Doppler detected in a Doppler filter bank. The relative frequency spacing between the three phases of the Doppler echo signal is characteristically related to the target range. The three phases of frequency-spaced Doppler information are sequentially fed, one phase at a time, to the range computer.

The range computer is synchronized to receive and store the Doppler information at digital times proportional to the frequency of the Doppler signal. Each phase of the Doppler information is stored in a separate channel of the range computer as digital information. After all three phases are thus stored, the relative spacing between the stored digital information is determined and this spacing information processed. The processed information is used to control the generation of a range signal proportional to increments of the target range. This range signal is thereafter used for modulating a range display.

The ranges of multiple targets can be simultaneously displayed by erasing the stored digital information after each display, thereby enabling the range computer to receive and store FM ranging information associated with a subsequent target as digital information. This subsequently stored digital information is processed and used to deflect the display beam along the Y-axis for range information as each target is detected. By also deflecting the display beam's X-axis sweep signal with search information such as with an azimuth information signal from the radar antenna resolvers, the multiple targets will be displayed in a matrix or pattern which is directly correlated with their actual relative position in space.

Other objects, features, and advantages of this invention will become apparent upon reading the following detailed description of several embodiments and referring to the accompanying drawings in which.

Figure 1:
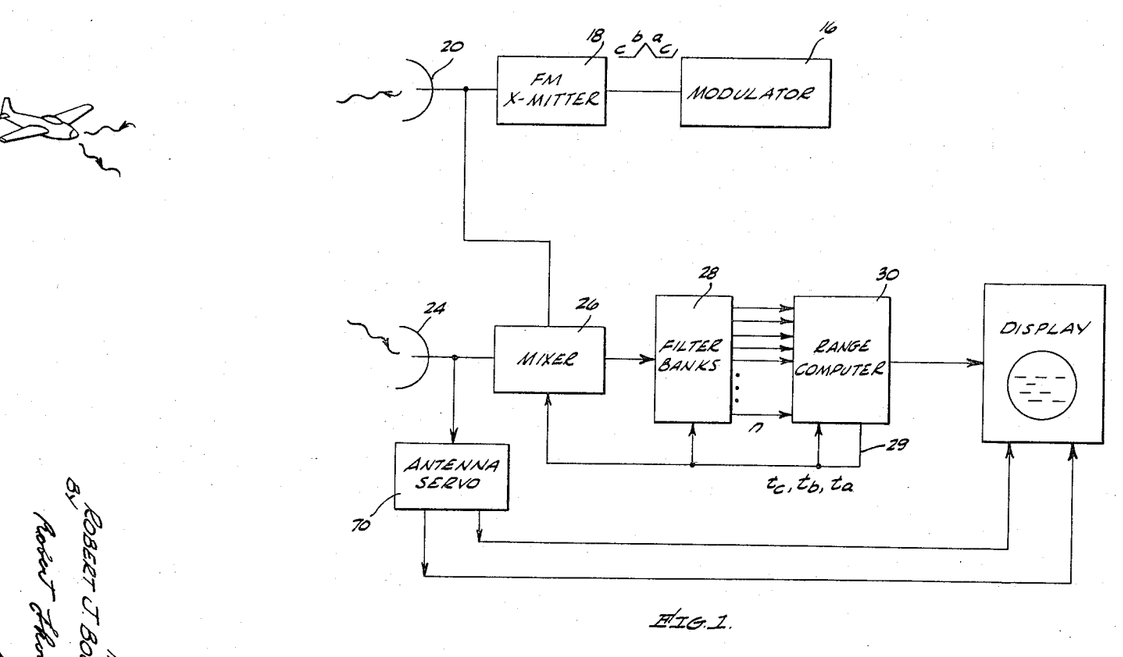
FIG. 1 is a block diagram of a system showing the relationship of the Doppler radar to a range computer and a target display.
Figure 2A:
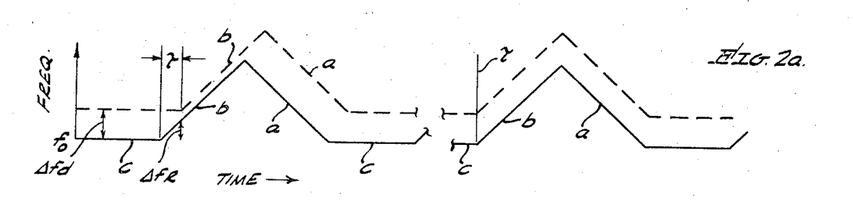
FIG. 2a is a graph illustrating the three-phase FM ranging modulation operation of the radar illustrated in FIG. 1.
Figure 2B:
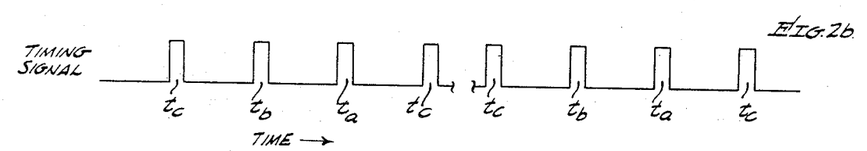
FIG. 2b is a timing chart having the same time scale as FIG. 2a representing a preferred time for transferring the Doppler information to a range computer.

Referring to the drawings, FIG. 1 includes an example of one type of Doppler radar with FM ranging that can be used for providing input signals for a range computer. To fully understand the operation of the radar of FIG. 1, reference should also be made to FIG. 2 which graphically illustrates a three-phase, frequency-modulated carrier signal operation (solid line curve) and the corresponding echo signal (dashed line curve) reflected from a target of interest.

The transmitted radar signal, as represented by the solid line curves of FIG. 2, is frequency-modulated into three sequential phases $c$, $b$, and $a$. This frequency-modulation can be accomplished by a modulator 16 which generates a repetitive series of voltage signals at pulse periods of 30 milliseconds, for example. During the first third of the pulse period (10 milliseconds), a constant voltage $c$-phase modulation signal is generated by the modulator 16. During the next third of the pulse period (10 milliseconds), an upsweep voltage signal increasing at a constant voltage rate is generated for modulating the $b$-phase signal. And during the last third of the pulse period, a downsweep voltage signal which decreases at a constant voltage rate, is generated for modulating the $a$-phase signal. Thereafter, the constant voltage $c$-phase signal is again started and the $c$-, $b$-, and $a$-phase modulating sequence repeated. These voltage signals from the modulator 16 are applied to control FM transmitter 18.

The FM transmitter 18 generates an output carrier signal having an instantaneous frequency proportional to the instantaneous amplitude of the voltage signal received from the modulator 16.

In other words, during the $c$-phase, the transmitted carrier signal has a constant frequency $f_c$. During the increasing voltage $b$-phase, the transmitted carrier signal increases at a frequency rate $\dot{f}$. And during the decreasing voltage $a$-phase, the transmitted carrier signal decreases in frequency at a rate of $-\dot{f}$. The FM transmitter 18 can be of any conventional type, such as those including a traveling wave tube, and generates a carrier signal of sufficient power to be radiated into space as a beam by an antenna 20.

When the transmitted beam is reflected from a target 22 moving relative to the radar, the corresponding echo signal is affected and provides target information.

To ensure that there is enough target information to provide usable data for the system, a proper choice of search parameters and beam width must be made. For example, if a raster scan search pattern is being made by the antenna 20, the scan rate must be sufficiently slow and the radar beam width sufficiently large so that each target will, at a minimum, be illuminated by all three FM phases $c$, $b$, and $a$ of the transmitted carrier signal. As a result, each target of interest reflects all three phases of the carrier signal as an echo signal having the corresponding three FM phases $c$, $b$, and $a$.

As previously stated, the echo signal is affected by the relative movement of the target 22 with relation to the radar and by the distance to the target. More specifically, the echo signal, as graphically represented by the dashed line in FIG. 2 is a reflection of the transmitted three FM phase transmitted signal, except that it is displaced in frequency an amount $f_d$ by the Doppler shift as a result of the velocity of the target 22 relative to the radar and is displaced in time an amount $\tau$ as a result of the two-way time delay required for propagation of the transmitted carrier from the radar to the target and back to the antenna 24.

Considering the doppler shift displacement first, when the reflecting target 22 is moving at a rate or velocity $\dot{R}$ relative to the radar, the echo signal is Doppler shifted an amount $f_d$ directly proportional to the range rate $\dot{R}$. More specifically, the amount of the Doppler frequency shift $$f_d = \frac{2\dot{R}}{\lambda}$$

where $f_d$ = amount of doppler frequency shift
$\dot{R}$ = velocity of target relative to the radar
$\lambda$ = wavelength of transmitted energy.

The time delay or displacement of the echo signal due to the two-way propagation time delay between the radar and the reflecting target $$f_r = \dot{f}\tau$$
$$= \frac{2R\dot{f}}{c}$$

where $$\tau = \frac{2R}{c}$$

$\tau = 2R/c$ = the two-way time delay between the radar and the reflecting target,
and R = range to target
$c$ = velocity of propagation
$\dot{f}$ = rate of change in the carrier frequency due to modulation.

Since the echo signal includes the component of the Doppler shift and the component of the two-way time delay, the three FM phases of the echo signal can be represented by $$f_{c,b,a} = f_d - f_r$$

Since, during the $c$-phase, $$\dot{f} = 0$$

then $$f_c = f_d = \frac{2\dot{R}}{\lambda}$$

during the $b$-phase $\dot{f}$ increases at a positive rate. Thus, $$f_d = f_d - f_r$$
$$= \frac{2\dot{R}}{\lambda} - \frac{2R\dot{f}}{c}$$

During the $a$-phase $\dot{f}$ decreases or has a negative rate. Consequently $$f_a = f_d + f_r$$
$$= \frac{2\dot{R}}{\lambda} + \frac{2R\dot{f}}{c}.$$

From the above discussion and analysis, it can be seen that certain predictable relationships always exist between the three phases of the echo signal. For example, the frequency of the $c$-phase $f_c$ is always midway between the frequency of the $b$-phase $f_b$ and the frequency of the phase $f_a$. In adidtion, the frequency of the $b$-phase signal $f_b$ is always less than the frequency of the $a$-phase signal $f_a$. As a result it is possible to determine the range of the target 22 by detecting the spacing between the resulting three FM phases of the echo signals. Thus, a detection of $c$-phase signal $f_c$ indicates the range rate $\dot{R}$ of a target that might have been detected. Then, a detection of the $b$-phase signal $f_b$ and the $a$-phase signal $f_a$ is made and the frequency spacing measured, whereby sufficient data is provided to determine the range R of the target 22.

The phase sequence of the echo signal is always $c$, $b$, $a$, since the carrier is always transmitted in that sequence. However, the echo signal may not always be received at the antenna 24 in $c$-, $b$-, $a$-phase order. In other words, the target may be illuminated by the transmitted carrier starting with the $b$-phase and then $a$- and $c$-phases or, even in an $a$-, $c$-, and $b$-phase order. In any event, one of the advantages of the range computer 30, which will be described shortly, is that it is not affected by the order in which the FM ranging information is received.

The echo signal is received at the antenna 24 and is applied to a mixer 26 where it is mixed with a portion of the transmitted carrier signal to provide an IF signal. The IF signal is applied to a Doppler filter bank 28 for determining the particular frequency of the signal. This Doppler filter bank can be of the type which has a plurality of parallel filter branches wherein the center frequencies of the individual filters are staggered to cover the entire range of possible Doppler frequencies. As a result, only that filter which is responsive to the particular Doppler frequency being received from mixer 26 will provide an output signal. To cover the entire Doppler bandwidth it may be necessary to use 1000 or more separate filters, whereupon the $n$th filter output may correspond to 1000 or more. Further discussion of Doppler filters can be found in Introduction to Radar Systems, by Skolnik, published by McGraw-Hill, Ch. 3, pp. 72–112, and especially pp. 80 and 81.

Of course, a single antenna duplexer radar system could be used wherein the transmitted carrier signal would operate on a pulsed Doppler principle. In any event, further detailed discussion of the operation of Doppler radar and FM ranging can be found in the previously referenced Introduction to Radar Systems. In addition, the different frequency modulations could be used other than the constant frequency, increasing frequency, and decreasing frequency phases.

Referring back to the Doppler filter bank 28 of FIG. 1, for all practical purposes at any instant of time during the pulse period only one of the particular Doppler filters is activated and produces an output signal. Such outputs of the Doppler filter bank 28 are scanned cyclically and the Doppler information fed sequentially to a range computer 30 and used to obtain range information. This scanning can be controlled by a standard electronic commutator which is synchronized by a clock pulse generator 29. In a simple form, the clock pulse can be generated by a timing or clock pulse track on a rotating magnetic drum.

The range computer 30 is enabled by timing signals $t_c$, $t_b$ and $t_a$ near or at the end of each FM phase $c$, $b$, and $a$, respectively (FIG. 2$b$), to receive the outputs of the Doppler filter bank 28. These timing signals $t_c$, $t_b$ and $t_a$ can be generated by a clock pulse synchronized logic circuit 29. An advantage of this delay in the timing signal is that the particular Doppler filter of interest has time to fully charge up while any filter charged for a preceding Doppler signal has time to discharge. Consequently, only the Doppler filter and Doppler frequencies of interest will be read during any one timing duration and any one scanning cycle.

Before the operation of the range computer 30 is discussed, certain arbitrarily selected postulates must be defined. For instance, it can be assumed that a computer bit time is the time necessary to scan one Doppler filter and equals one unit of range. A unit of range can be arbitrarily chosen to equal five miles. Assuming then that the radar has a range limitation of 150 miles, the maximum spacing between the Doppler $c$-phase signal $f_c$ and the Doppler $b$-phase signal $f_b$ is 30 bits down and between the Doppler $c$-phase signal $t_c$ and the Doppler $a$-phase signal $f_a$ is 30 bits up. For lesser five mile increments of range, the bit spacing will be proportionally less.

Thus, during the cyclic scanning and reading of the Doppler filters, the $c$-phase signal $f_c$ is written into the range computer first during the timing interval $t_c$ at a specific time $T_c$ and is hereafter considered as a $c$-phase digital reference signal $T_c$ associated with a certain target.

On the next cyclic scan of the Doppler filters, the $b$-phase Doppler detected signal $f_b$ is scanned and written into the range computer 30 during the timing interval $t_b$ at a specific time $T_b$ and is hereafter considered the $b$-phase digital signal $T_b$.

Now considering the Doppler outputs on a time base relationship rather than a frequency relationship, the computer must be synchronized so that the same Doppler filter always scans and writes the scanned digital information at the same relative time position during the computer cycle. Consequently, the $b$-phase digital signal $T_b$ varies in time from the previously written $c$-phase digital signal $T_c$ in computer time by $$T_b = T_c - T_r$$

where $T_r$ (digital range signal) equals the bit time spacing between the Doppler detected $c$-phase signal $f_c$ and the $b$-phase signal $f_b$ and can vary from 30 bits for a range of 150 miles down to 0 bits for a range between 0 and 5 miles.

On the third scan of the Doppler filter bank 28, the $a$-phase Doppler signal $f_a$ is written into the range computer 30 during the timing interval $t_a$ at a specific time $T_a$ and is hereafter considered the $a$-phase digital information $T_a$. Because of the synchronized operation of the computer, the $a$-phase digital information $T_a$ varies from the previously written $c$-phase digital information $T_c$ in the computer time base by $$T_a = T_c + T_r$$

where $T_r$ = the bit time spacing between the Doppler detected $c$-phase digital information $T_c$ and the $b$-phase digital information and can vary from 30 bits for a range of 150 miles down to 0 bits for a range between 0 and 5 miles.

Figure 3:
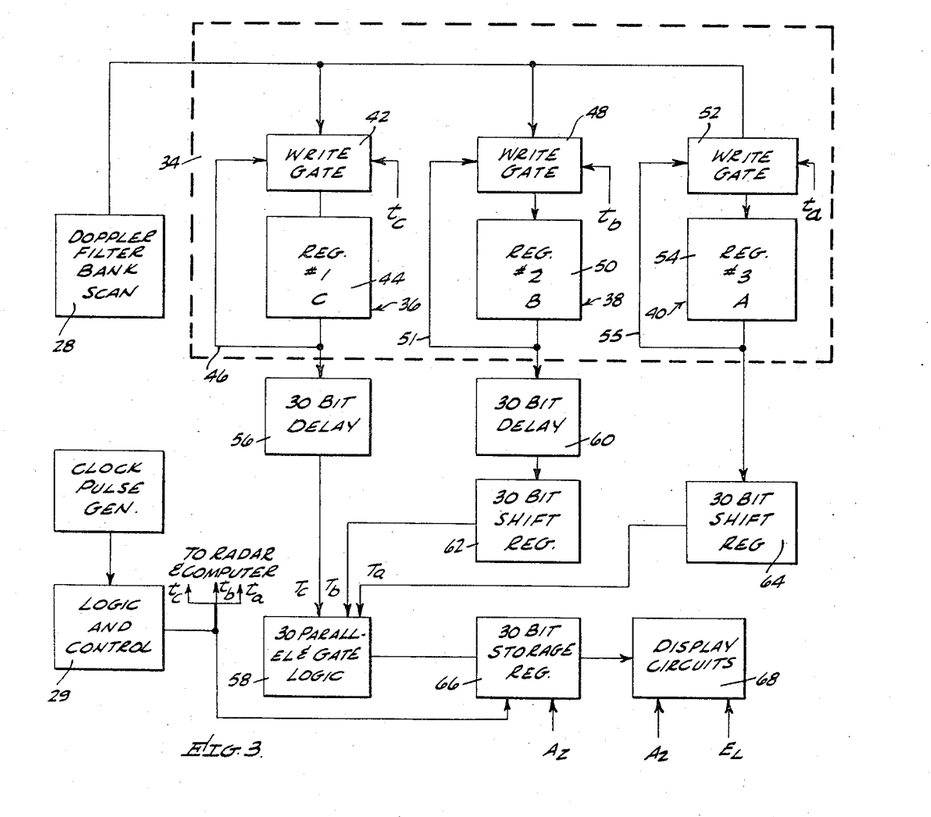
FIG. 3 is a block diagram illustrating an embodiment of the range computer.
Figure 4:
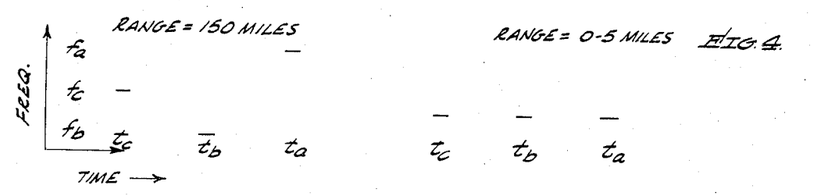
FIG. 4 is a graph illustrating the frequency of the Doppler information versus the time at which the information is transferred to the range computer as Doppler information for two separate targets.

To sequentially receive the three bits of information, the range computer 30 illustrated in FIG. 3 includes a storage device 34 having three parallel channels 36, 38, and 40, each of which can be selectively coupled to receive the Doppler output signals scanned from the Doppler filter bank 28. The Doppler filter information is written into these three circuit channels sequentially, and when all three channels are loaded with digital information, the information is processed and the range to the target computed in a manner to be described shortly.

Figure 5:
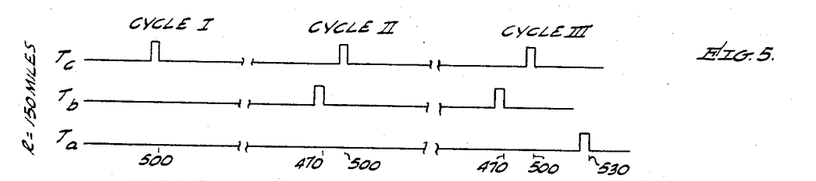
FIG. 5 is a timing chart illustrating the timing sequence of loading the three phases of Doppler information into the computer for a target at a range of 150 miles.

Referring now to the operation of the range computer 30, and considering that the $c$-phase signal $f_c$ is detected at the Doppler filter bank 28 and scanned first the $c$-phase signal $f_c$ is written into the first parallel computer channel 36 at a specific time $T_c$ during the timing interval $t_c$ through a write gate 42. Hereinafter, channel 36 will also be referred to as the $c$-channel and the individual elements contained in the branch may also be identified by a "$c$" prefix. Assuming, for purposes of description, that the 500th of the 1000 Doppler filters is activated by the $c$-phase signal $f_c$ and that the scanning of the 500th filter occurs at the bit time interval $T_c = 500$ then, when the write gate 42 is enabled by the timing pulse $t_c$, the $c$-phase Doppler information $f_c$ from the 500th Doppler filter is written into a storage register hereinafter also referred to as a circulating register 44 at the specific time $T_c$ where $T_c$ is the 500th bit time interval, as graphically illustrated in the timing chart of FIG. 5. The circulating register 44 continually recirculates the $c$-phase digital information $T_c$ until the next timing pulse $t_c$ is received. Thus, during this time, the other two parallel computer channels 38 and 40 will have the $b$-phase Doppler information $f_c$ and the $a$-phase Doppler phase information $f_a$ written into them respectively. To continuously recirculate the digital information $T_c$, the output from the last stage of the circulating register 44 is fed back to the write gate 42 over a feedback loop 46. The write gate 42 again writes this digital information $T_c$ into the circulating register 44 at the 500th bit time interval of the next computer cycle. Structurally, the write gate can be of the type described in Digital Computers and Control Engineering, by Ledley, published by McGraw-Hill, Ch. 22, pp. 724–757 and especially pp. 732–739. In its simplest form, the circulating register 44 can be a segment of a track on a magnetic drum 1000 bits long—one bit for each Doppler filter. Alternatively, the circulating register 44 can be of the flip-flop type or the magnetic core type.

The parallel computer channel 38 is loaded with the $b$-phase Doppler information $f_b$ during the next subsequent computer cycle. The $b$-phase information $f_b$ is obtained when the Doppler filter bank 28 is again scanned in synchronism with the computer cycle so that the $b$-phase Doppler information $f_b$ is applied to the write gate 48 at the specific time $T_b$ during the timing interval $t_b$ when the write gate is enabled. Considering then that the target is at the maximum range of 150 miles, the $b$-phase Doppler information $f_b$ will activate the 470th Doppler filter since, as already postulated, the $c$-phase Doppler information had activated the 500th Doppler filter and the frequency of the $b$-phase Doppler information is the equivalent to 30 filters less than the Doppler filter bandwidth. Consequently, the $b$-phase information will be entered into the write gate 48 at a bit time interval $T_b = (500\text{th} - 30)$ or 470th bit time interval.

The $b$-phase Doppler information is then written into a second storage register, hereinafter also referred to as a circulating register 50, as $b$-phase digital information $T_b$ and recirculated over the feedback loop 51 while the next parallel computer channel 40 is subsequently loaded with the $a$-phase Doppler information $f_a$. The write gate 48 and circulating register 50 are substantially identical to the previously described write gate 42 and circulating register 44, respectively. Thus, when the next $b$-phase timing pulse $t_b$ is received by the write gate 42, the information is not fed back to the circulating register 50 and is thus lost.

On the next subsequent cycle of the computer, the $a$-phase Doppler information $f_a$ is written into the parallel computer channel 40. To write the $a$-phase Doppler information $f_b$ into the computer channel 40, the Doppler filter bank 28 is again scanned in synchronism with the computer cycle, wherein the Doppler filter containing the $a$-phase Doppler information $f_a$ is scanned at a specific time $T_a$ during the timing interval $t_a$ during which a write gate 52 is enabled. Again, since the target is assumed to be at a maximum range of 150 miles, the frequency difference between the $c$-phase doppler information $f_c$ and the $a$-phase Doppler information $f_a$ is sufficient to space the respectively activated Doppler filters in the Doppler bandwidth by 30 filters. Thus, since it has already been postulated that the $c$-phase Doppler information $f_c$ activates the 500th filter, then, the $a$-phase Doppler information activates the (500th+30) Doppler filter or 530th Doppler filter. Consequently, since the Doppler filters are scanned in synchronism with the computer cycle, the $a$-phase Doppler information $f_a$ will be applied to the write gate 52 as digital information $T_a$ during the 530th bit time interval of the computer cycle.

Operationally, the write gate 52 is enabled during the timing interval $t_a$ to write the $a$-phase Doppler information $f_a$ into a third storage register, hereinafter also referred to as a circulating register 54. Thereafter, if all three circulating registers 44, 50, and 54 are loaded, the information contained therein is processed in a manner to be described shortly, and the target range computed.

In case, however, the FM ranging Doppler information has not been written into the computer in a $c$-$b$-$a$ order, a feedback loop 55 is also provided in the $a$-channel wherein the $a$-phase digital information $T_a$ is continually recycled through the write gate 52 for three cycles or until all three registers are loaded with information.

To compute the target range R, the three phases of digital information in the registers is processed for determining the logic relationship between all three bits of information. This logic relationship is used to produce a range output signal having an amplitude proportional to the range R. Such logic relationship is determined by a logic circuit 58 which is coupled to receive the three bits of digital information from the three computer channels. If information from any computer channel is missing, the information is not processed. Thus, false Doppler signals are eliminated.

In operation, the $c$-phase digital information $T_c$ from the circulating register 44 is fed directly to the logic circuit 58 through a delay circuit 56 which has a 30-bit time interval delay. Thus, the $c$-phase Doppler information $f_c$ is fed to the logic circuit 58 at the (500th+30) bit time interval which can be considered the reference or read time for determining the timing relationship between the $b$-phase digital information $T_b$ and the $a$-phase digital information $T_a$.

The $b$-phase digital information $T_b$ is also applied to the logic circuit 58. In operation, the $b$-phase digital information $T_b$ from the circulating register 50 is fed through a delay circuit 60 which delays the information for a 30-bit time interval $\Delta T$ before feeding the digital information to a 30-bit shift register 62. Consequently, the $b$-phase digital information $T_b$ is not loaded into the shift register 62 until the time interval $$T = T_b + \Delta T = (470\text{th} + 30) \text{ time interval}$$
$$= 500\text{th time interval}.$$

Several delay circuits capable of performing this function are the rotating disk or drum delay circuits, or electromagnetic or acoustic delay lines. Digital Computers and Control Engineering, Ledley, McGraw-Hill, Ch. 15, pp. 500–501. The shift register 62 can be a serial write-in parallel readout shift register of the type described and illustrated in Digital Computers and Control Engineering, Ch. 15, pp. 487–489. Thus, for the assumed target range of 150 miles, when the $c$-phase digital information $T_c$ is applied to the logic circuit 58 at the 530th time interval, the $b$-phase digital information $T_b$ will have been shifted to the 30th stage of the shift register 62. The $b$-phase digital information $T_b$ is thus applied to the logic circuit 58 from this last shift register stage.

The $a$-phase digital information $T_a$ in the $a$-channel is also applied to the logic circuit 58. In operation, the $a$-phase digital information $T_a$ is fed from the last or output stage of the circulating register 54 to a shift register 64, at the time interval T where $$T = T_a$$
$T_a = 530$th bit time for the presumed range of 150 miles.

The shift register 64 in the $a$-channel is also a 30-stage serial write-in parallel readout shift register of the type previously described for channel $b$. Thus, at the 530th bit time interval that $T_c$ is applied to the logic circuit 58, the $a$-phase digital information $T_a$ is in the first stage of the shift register 64. The digital information $T_a$ is thus applied to the logic circuit 58 from the first stage.

The digital information in all three channels can be processed by the logic circuit 58 to confirm the presence of a target and to determine the target range. To process this information, the logic circuit 58 includes 30 AND gates connected in parallel circuit relationship. One terminal of each AND gate is connected to receive the $c$-phase digital information $T_c$, whereas the other two terminals of each AND gate are connected to receive the $b$-phase digital information $T_b$ from a terminal of the parallel readout shift register 62 and the $a$-phase digital information $T_a$ from an output terminal of the parallel readout shift register 64.

One logical connection for these AND gates and the $b$-channel shift register 62 and the $a$-channel shift register 64 would be: for the first AND gate the $T_b$ information input terminal is connected to the first stage of shift register 62 and the $T_a$ information input terminal is connected to the last stage of the shift register 64; for the second AND gate, the $T_b$ information input terminal is connected to the second stage of the shift register 62 and the $T_a$ information input terminal is connected to the 29th stage of the shift register 64; for the third parallel AND gate, the $T_b$ information input terminal is connected to the third stage of the shift register 62, and the $T_a$ information input terminal is connected to the 28th stage of the shift register 64. This logic pattern is continued until the 30th parallel AND gate is connected so that the $T_b$ information input terminal is connected to the 30th stage of the shift register 62 and the $T_a$ input terminal is connected to the first stage of the shift register 64. As a result of this logic arrangement, only one of the 30 output terminals of the logic circuit 58 produces an output signal for a 30-bit storage register 66 when all three phases of digital information is received. Thus, with all three phases of digital information occurring, the presence of a target is confirmed and the target range is determined by the frequency spacing between the three phases of information.

The storage register 66 receives the digital information from the logic circuit 58 and stores the information for as long a time as it will be needed. One type of storage register that can be used is described and illustrated in Digital Computer and Control Engineering, Ch. 15, pp. 487–489. The range information stored in the storage register 66 is read out in proper sequence with the search sweep azimuth or elevational information displayed in a display circuit 68. To properly display the target range, the range information from the storage register 66 can be converted to voltage signals having an amplitude proportional to the range or converting to a gating signal. Consequently, the range information can be used to displace the targets along the Y-axis of the display tubes, whereas, search information such as the azimuth information can be used to displace the target along the X-axis. As a result, the coordinates of the displayed information will provide both range information and azimuth information in the same pattern as the targets appear in the search volume.

The range display circuit can include a voltage ramp generator which is gated to provide an output pulse having an amplitude proportional to the amplitude of the range signal at the time the logic circuit pulse is received. Thus, since the time that the logic circuit pulse is received is proportional to the range, as previously described, the amplitude of the range output signal R of the range sweep circuit 68 is also proportional to the range.

The above described operating principles are applicable for processing FM ranging information corresponding to additional targets traveling at the same or different relative velocities and at different ranges. For example, a target may be traveling at a relative velocity $V_2$ and be at a range between five and ten miles away from the radar. At this close range, the two-way time delay $\tau$ would be much less than the previously described target at 150 miles. Consequently, the time delay shift in the echo signal would be much smaller, as represented by the second set of triangular curves in FIG. 2b. In addition, the Doppler frequency displacement $f_d$ would also be different from the preceding example because the different relative velocity of the target causes a different Doppler shift in the echo signal. As a result, the echo signal fed to the filter bank 28 affects different individual Doppler filters.

Figure 6:
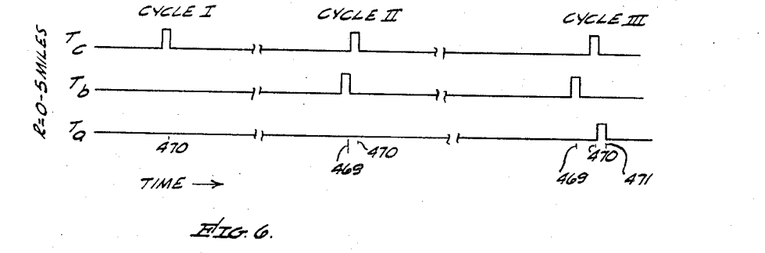
FIG. 6 is a timing chart illustrating the timing sequence in which the three phases of Doppler information are loaded into the range computer for another target at a range between five and ten miles.

In accordance with the above postulated operating conditions, the $c$-phase Doppler echo signal $f_c$ could energize a Doppler filter such as the 470th of the 1000 Doppler filters in the Doppler filter bank 28. The upsweep $b$-phase echo signal could next energize the 469th Doppler filter, whereas the downsweep $a$-phase echo signal could energize the 471st Doppler filter. It should, of course, be understood that these are only postulated operating conditions. These three phases of Doppler information are fed to the three channels of the computer 30 and are processed as digital information into range information in the same cyclic manner as previously described. For example, referring to the timing chart of FIG. 6, the $c$-phase Doppler information $f_c$ from the 470th Doppler filter is entered into the circulating shift register 44 of the $c$-channel 36 as digital information $T_c$ at the 470th bit time interval. On the second computer cycle, the $b$-phase Doppler information from the 469th Doppler filter is entered into the circulating register 50 of the $b$-channel as digital information $T_b$ at the 469th bit time interval. On the third computer cycle, the Doppler filter bank is again scanned and the $a$-phase Doppler information from the 471st Doppler filter is entered into the circulating register 54 of the $a$-channel as digital information $T_a$ at the 471st bit time interval.

By the third computer cycle, all three channels are loaded with the digital ranging information and the logic circuit 58 can process the information into a range signal. This processing is again accomplished by feeding the $c$-phase digital information $T_c$ to the logic circuit 58 through the 30-bit delay circuit 56 at a time $$T_c = 470 + 30 = 500\text{th bit interval}$$

The $b$-phase digital information $T_b$ is fed to the logic circuit 58 from the circulating register 50, through the 30-bit delay circuit 60, and from the first stage output terminal of the 30-bit shift register 62 at the 500th bit time interval. The $a$-phase digital information $T_a$ is applied to the logic circuit 58 from the circulating register 54, through the 30th output stage terminal of the shift register 64 at the 500th bit time interval.

The parallel AND gates of the logic circuit 58 processes both the presence or occurrence of three bits of digital information to confirm the presence of a target and the bit spacing between the $b$-phase digital information $T_b$ and the $a$-phase digital information $T_a$ to generate an output signal on the appropriate one of 30 AND gate output terminals which is indicative of the largest range. Because of the change in the position of the digital information in the shift registers 62 and 64, a different AND gate associated with a range between five and ten miles is activated. Consequently, a different output bit is stored in the storage register 66. The storage register 66 then feeds the particular bit of information to the display circuit 68 wherein a range signal having a voltage proportional to the target range is generated. And, because the target is relatively near to the radar, the amplitude of the range signal would be proportionately less than the amplitude of the range signal for the previously described 150-mile range.

Figure 7:
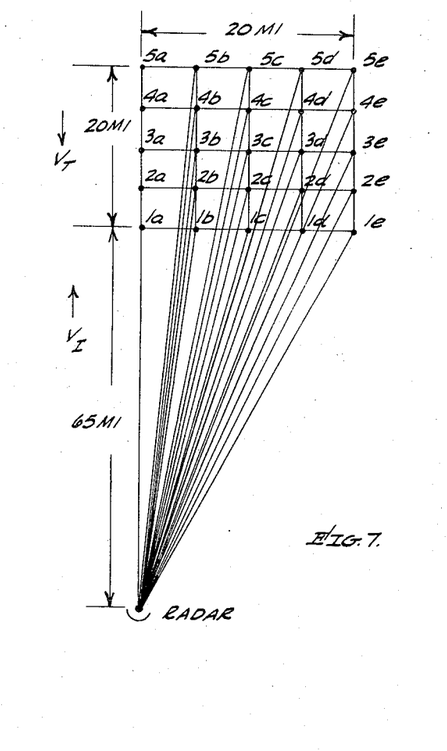
FIG. 7 is a schematic illustration of an attack force of targets moving toward a radar and range computer.

Multiple targets can be simultaneously displayed as range, and search coordinate information such as azimuth or elevation information in accordance with the above described operating principles. For example, as schematically illustrated in FIG. 7, an attack force of twenty-five target aircraft, all located at the same altitude, are closing in on the radar station at a velocity of 5,000 f.p.s., their relationship and spacing is five miles between each target and they are all located within a 20-mile by 20-mile square. The closest target 1a is 65 miles away from the radar, whereas, the furthest target, 5e, is about 90 miles away.

The radar illuminates the targets in the attack force during each search scan and the Doppler radar information is processed into range information and azimuth information in the manner previously described. This range and azimuth information is then displayed in a B-scope display, with the range information determined by the coordinate of the display mark along the Y-axis of the azimuth information being represented by the coordinate along the X-axis of the display. Consequently, the targets appear on the display in these same relative positions in space.

Figure 8:
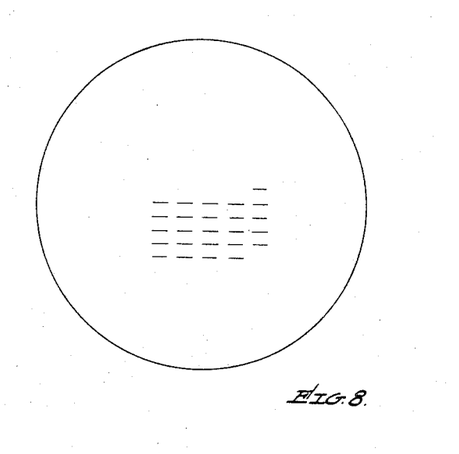
FIG. 8 is a schematic illustration of a composite target display that could occur for the target of FIG. 7.

All of the target aircraft may not be illuminated and detected on every sweep of the radar because of eclipsing, fading, scintillation, etc. For example, the display represented by FIG. 8 may occur on one sweep wherein some of the targets may appear and disappear. The probability of a target disappearing over any significant length of time is, of course, negligible.

Other means and techniques can be used to accomplish the above-described results. For example, it would also be possible to use a magnetic core for the storage registers 44, 50, and 54. In this regard, the magnetic cores could be organized into three groups or channels with one core bit for each Doppler filter position in each phase of Doppler information. Structurally, the cores could be organized as a shift register or as a digital memory array.

In addition to the above structural modifications, it would be possible to use other write and read techniques on the storage registers 44, 50, and 54. For example, the Doppler information could be written into the storage registers from the Doppler filters on a parallel write-in basis, or on a combination serial-parallel, word-by-word basis, wherein groups of Doppler bits would be arbitrarily designated as a word. These write operations could be achieved with conventional serial-to-parallel shift registers.

In addition, the read operation could be modified wherein the information stored in the storage registers 44, 50 and 54 could be read out on a parallel basis by means of an appropriate scanning or commutating technique such as by shift registers. The bit occurrence and bit spacing between the three phases of information could logically compare to one another either simultaneously or sequentially to confirm the presence of a target and to determine the range of the confirmed target, much in the same manner as described above.

The digital information could also be read out sequentially phase-by-phase from the storage registers. In this manner, the $c$-phase would be read first to determine the presence of a possible target. Then, the $b$-phase digital information would be read out to determine the bit spacing between the phases of digital information. And, then, the $a$-phase digital information bit, corresponding to the particular $b$-phase information bit, read for coincidence to confirm the occurrence of an actual target. After that target has been confirmed and the range information processed, the remaining $c$-phase information could be scanned until a next $c$-phase information bit is read. Thereafter, the $b$-phase and then the $a$-phase digital information read to confirm the presence of and determine the range of a target.

In the above-described modified circuit, the associated control and timing circuit could be designed in accordance with logical design considerations wherein conventional logic gates, counters, registers, clock pulse generators, and flip-flops etc. would be arranged in accordance with specific logical equations.

Figure 9:
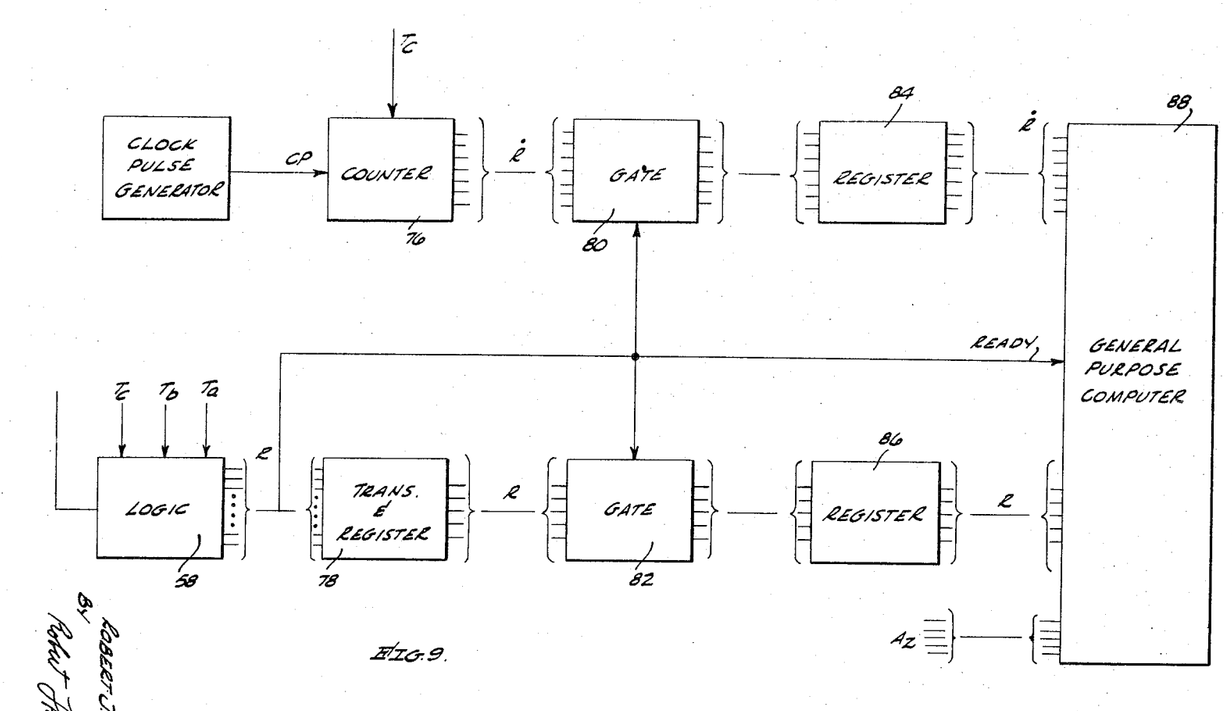
FIG. 9 is a block diagram of a second embodiment of a circuit for converting the search target information to a digital form for use with a digital computer.

Other embodiments of the range computer can be constructed which, instead of feeding the range R and range rate $\dot{R}$ information directly to a display, convert the information to a digital form and feed it to a general purpose digital computer 88 for processing therein.

An example of one such embodiment is illustrated in FIG. 9 in which the range signal R from the logic circuit 58 and the range rate signal $\dot{R}$ associated with the $c$-phase digital signal $T_c$ are converted to a digital form such as parallel binary digits. In operation, the counter 76 is loaded step-by-step with clock pulses from the synchronized clock pulse generator until the $c$-phase digital information signal $T_c$ is received. At this time, the digital count of the counter 76 is stopped and can thereafter be read out in parallel. Since the clock pulse generator is synchronized with the digital pulse position of $c$-phase digital information $T_c$, the binary count in the counter 76 is representative of the pulse position of the $c$-phase signal $T_c$. Since the pulse position of the $c$-phase information is proportional to the range rate $\dot{R}$ of the particular target, the output of the counter 76 is proportional to the range rate $\dot{R}$ in binary digital form.

The range signal R is converted from the one-out-of-thirty signal outputs from the logic circuit 58 to a digital form such as a parallel binary weighted code. In operation, the 30 outputs from the logic circuit 58 are fed to a translator and register 78 which converts the one-out-of-thirty codes to a parallel binary code and holds the translated binary coded number in a parallel output register stage.

In addition, the one-out-of-thirty range signal R is applied to enable an inhibit gate 80 in the range rate $\dot{R}$ channel and to enable an inhibit gate 82 in the range R channel. When these inhibit gates receive the range signal R, they are enabled to conduct the parallel digital range rate signal $\dot{R}$ from the counter 76 to a buffer register 84 and to conduct the range signal R from the translator and register 78 to a buffer register 86. The one-out-of-thirty range signal R is also fed to a general purpose computer 88 to notify the computer that range rate $\dot{R}$ and range R information is loaded in the buffer registers 84 and 86 and is ready to be fed into the computer.

The general purpose computer receives the digital information from the buffer registers 84 and 86, whereupon the circuit of FIG. 9 is ready to convert the range and range rate information for a next target. The general purpose computer 88 can then process the range R and range rate $\dot{R}$ information, whereupon it is possible to generate target display signals, to track the target, and to perform any other necessary signal processing operation.

In addition, the search sweep signal, such as the azimuth signal $A_z$, can be converted to a digital form and fed to the general purpose computer 88. This could easily be done by using a digital shaft encoder at the antenna servo 70 of FIG. 1.

It should be understood that other techniques and means could be used to obtain the same results. For example, the binary digits could be serial and greater use could be made of arithmetic units such as adders and subtractors of the type described in U.S. Patent No. 2,936,116, issued to P. A. Anderson, et al. on May 10, 1960.

While salient features have been illustrated and described with respect to a particular embodiment, it would be readily apparent that other modifications can be made within the spirit and scope of the invention, and it is, therefore, not desired to limit the invention to the exact details shown and described.

What is claimed is:

1. In a radar system of the type in which radar signals reflected from a target have a first frequency component representative of range rate, and second and third frequency components which are frequency spaced from the first frequency component by an amount proportional to the target range, a range computer comprising: circulating storage means coupled to receive the frequency component information for storing each frequency component as a digital bit of information each at a single digital bit position proportional to the digital time base of the information; and logic means coupled to receive the stored digital information from said circulating storage means for determining the presence of a target from the occurrence of the three digital bits of information and the range from the bit position spacing between one of the other two digital bits relative to the first digital bit of information.

2. In combination with a frequency modulated radar of the type in which signals reflected from a target have a first frequency component, and second and third frequency components which are frequency spaced equal increments from the first frequency component by an amount proportional to a target range, a range computer comprising: means coupled to sequentially receive the three frequency components of the information and being operable to convert the received frequency information from a frequency base to a digital time base bit position proportional to the respective frequency component; storage register means coupled to sequentially receive the three components of time-base-converted information for storing the information as digital information at bit positions proportional to the digital time base position of the information and to the sequence thereof; and logic means coupled to receive the stored digital information from said storage register means for determining the occurrence of a possible target from the bit of digital information related to the first frequency component, the target range from the bit position spacing between the first bit of digital information and a second of the other two bits of digital information, and confirms the target occurrence from the bit position spacing of the third bit of digital information relative to the first and second bits of digital information.

3. The range computer of claim 2 further including a display signal generating means coupled to said logic means for generating a range signal proportional to the bit spacing between the two components of stored digital information at an azimuth position whenever the three components of stored digital information is received.

4. The range computer of claim 2 in which said storage means includes a first channel recirculating register, a second channel recirculating register, and a third channel recirculating register, said channels being operable to sequentially receive the three components of time-base-converted information, respectively, for storing the information as digital information at a digital bit position representative of the digital-time-base position of the information.

5. The device of claim 4 further including output register means coupled to receive the digital information from said logic means for converting the digital information to a digital code representative of the target and its range.

6. The range computer of claim 5 further including a display signal generating means coupled to said output register means, means for generating display signals proportional to the digital range signal information whenever three components of stored digital information is received.

7. The device of claim 5 further including display signal generating means coupled to said output generator means and responsive to azimuth signals generated by the radar for generating a range signal proportional to the bit spaced between the three components of stored digital information, and at an azimuth time corresponding to the azimuth coordinate information from the radar to display the target in the same relative position as it appears in space.

8. The range computer of claim 4 further including a timing means coupled to said first channel, to said second channel and to said third channel and being operable to sequentially enable said first channel, said second channel, and said third channel to receive the three components of time-base-converted information respectively during three separate timing intervals.

9. The device of claim 8 in which said first channel and said second channel and said third channel are each further operable to erase previously stored digital information when operably enabled to receive the respective component of time base information.

10. In combination with a Doppler search radar of the type in which echo signals from modulated transmitted energy is in the form of ranging information having a first frequency component, and second and third frequency components which are frequency spaced equal and opposite increments from the first frequency component by an amount proportional to a target range, the three frequency components occurring sequentially, a computer comprising: means coupled to receive the three frequency components of the ranging information and being operable to convert the received information from a frequency base to a digital time base position proportional to the frequency; recirculating storage register means coupled to sequentially receive the three components of time-base-converted information for storing the information as digital information at a first, a second, and a third digital bit position respectively proportional to the digital time base position of the corresponding frequency information; and logic means coupled to receive the stored digital information from said recirculating storage register means for determining a target and the target range from the occurrence of the three bits of digital information and the bit position spacing between the two bits of digital information respectively.

11. The device of claim 10 further including output register means coupled to receive the digital information from said storage means and said logic means for converting the digital information to a digital signal representative of the target range.

12. The range computer of claim 11 further including a display signal generating means coupled to said logic means for generating a range signal proportional to the digital signal representative of the target range.

13. The device of claim 10 in which said storage means includes a first channel circulating register means, a second channel circulating register means, and a third channel circulating register means, said channel circulating register means being selectively operable to sequentially receive the three components of time-base-converted information, respectively, for storing the information as digital information at digital bit positions proportional to the digital time base position of the information.

14. The device of claim 13 further including means coupled to receive the digital information from said storage means and said logic means for converting the digital information to a digital signal representative of the target range.

15. The device of claim 13 further including a timing means coupled to said first channel, to said second channel and to said third channel and being operable to sequentially enable said first channel, said second channel, and said third channel to receive the three components of time-base-converted information during three separate timing intervals and for erasing previously stored components of information in the circulating registers when enabled to receive each of the three components of information.

16. The range computer of claim 13 further including a control means coupled to said first channel means, to said second channel means, and to said third channel means and being operable to sequentially enable said first channel means, said second channel means, and said third channel means to selectively receive one of the three components of time-base-converted information near the end of the duration of the frequency component.

17. The range computer of claim 16 further including a display signal generating means coupled to said logic means for generating a signal proportional to the bit spacing between the three components of stored digital information whenever the three components of stored digital information is received in azimuth relationship to the target spatial position.

18. A target ranging system comprising: a Doppler search radar transmitter for transmitting energy, means coupled to said transmitter for frequency modulating the transmitted energy into three sequential phases including a first constant frequency phase, a second changing frequency phase, and a third changing frequency phase; means coupled to the transmitter and being responsive to a reflected echo signal corresponding to the transmitted energy for generating ranging information having a first frequency component, and second and third frequency components which are frequency spaced from the first frequency component by an amount proportional to a target range; means coupled to receive the three frequency components of the ranging information and being operable to convert the received information from the frequency base to a digital-time-base position proportional to the frequency; storage means coupled to sequentially receive the three components of the base-converted information for storing the information and digital information at digital bit positions proportional to the digital base position of the information and proportional to the sequence thereof; and logic means coupled to receive the stored digital information for determining the occurrence of and the bit position spacing between the three components of stored digital information.

19. The device of claim 18 further including means coupled to receive the digital information from said storage means and said logic means for converting the digital information to a weighted digital code representative of the target and its range.

20. The range computer of claim 18 further including a display signal generating means coupled to said logic means for generating a signal proportional to the bit spacing between the three components of stored digital information whenever the three components of stored digital information is received.

21. The device of claim 18 in which storage means includes a first channel, a second channel, and a third channel, said channels being selectively operable to sequentially receive the three components of time-base-converted information, respectively, for storing the information as digital information at digital bit positions proportional to the digital time-base position of the information.

22. The range computer of claim 21 further including a display signal generating means coupled to said logic means for generating a signal proportional to the bit spacing between the three components of stored digital information whenever the three components of stored digital information is received.

23. The range computer of claim 18 further including a means coupled to said first channel, to said second channel and to said third channel and being operable to sequentially enable said first channel, said second channel, and said third channel to receive the three components of time-base-converted information during the last portion of each of the related ones of the three sequential times the signals are received.

24. The range computer of claim 23 further including a display signal generating means coupled to said logic means for generating a signal proportional to the bit spacing between the three components of stored digital information whenever the three components of stored digital information is received.

25. The system of claim 18 further characterized by a sweep signal generator responsive to the instantaneous position of the search sweep of the transmitted energy for generating a signal proportional to the position; and a display signal generating means coupled to said logic means and to said sweep signal generating means for generating a target signal proportional to the bit spacing between the three components of stored digital information whenever the three components of stored digital information is received and corresponding to the sweep signal position at the time of receipt.

References Cited
UNITED STATES PATENTS

| | | | |
|---|---|---|---|
| 3,149,326 | 9/1964 | Naidich | 343—14 X |
| 3,182,308 | 5/1965 | Dutton et al. | 343—10 X |
| 3,277,473 | 10/1966 | Calhoon et al. | 343—5 |

RODNEY D. BENNETT, *Primary Examiner.*

C. L. WHITHAM, *Assistant Examiner.*